US010000262B2

(12) United States Patent
Ando et al.

(10) Patent No.: US 10,000,262 B2
(45) Date of Patent: Jun. 19, 2018

(54) DATA-PROCESSING DEVICE, PROGRAM, RECORDING MEDIUM AND DATA-PROCESSING METHOD FOR GENERATION OF DATA THAT INDICATES NAVIGATION PERFORMANCE OF SHIP

(71) Applicant: NIPPON YUSEN KABUSHIKI KAISHA, Tokyo (JP)

(72) Inventors: Hideyuki Ando, Tokyo (JP); Shusaku Ueno, Tokyo (JP)

(73) Assignee: Nippon Yusen Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/025,319

(22) PCT Filed: Sep. 27, 2013

(86) PCT No.: PCT/JP2013/076345
§ 371 (c)(1),
(2) Date: Mar. 28, 2016

(87) PCT Pub. No.: WO2015/045117
PCT Pub. Date: Apr. 2, 2015

(65) Prior Publication Data
US 2016/0229500 A1    Aug. 11, 2016

(51) Int. Cl.
*B63B 49/00* (2006.01)
*B63H 25/04* (2006.01)
(Continued)

(52) U.S. Cl.
CPC ............ *B63B 49/00* (2013.01); *B63H 25/04* (2013.01); *G01C 21/203* (2013.01); *G06F 3/14* (2013.01);
(Continued)

(58) Field of Classification Search
CPC ........... G06F 3/14; B63B 49/00; B63H 25/04; B63H 2025/045; B63J 2099/008; G06T 11/206
See application file for complete search history.

(56) References Cited

U.S. PATENT DOCUMENTS

| 2010/0168942 | A1* | 7/2010 | Noffsinger | B61L 3/006 |
| | | | | 701/21 |
| 2010/0185471 | A1* | 7/2010 | Chen | G06Q 10/06 |
| | | | | 705/7.38 |
| 2012/0259489 | A1* | 10/2012 | Hamamatsu | B63H 25/04 |
| | | | | 701/21 |

FOREIGN PATENT DOCUMENTS

| JP | 2013006531 A | 1/2013 |
| JP | 2013104690 A | 5/2013 |
| JP | 2013107488 A | 6/2013 |

OTHER PUBLICATIONS

Written Opinion issued in corresponding PCT Application No. PCT/JP2013/076345 dated Dec. 24, 2013, pp. 1-11.
(Continued)

*Primary Examiner* — Yuen H Wong
(74) *Attorney, Agent, or Firm* — MKG, LLC

(57) ABSTRACT

A terminal device stores ship characteristic data that indicates a relationship between rotation speed and ship speed, and rotation speed and fuel consumption when a ship is navigated under various navigation conditions. If a user inputs data that indicates draft state and wind and wave state on a performance display screen displayed on the terminal device, the terminal device generates relationship data that indicates a relationship between rotation speed and ship speed, and rotation speed and fuel consumption when a ship is navigated under wind and wave states corresponding to the input data and each of a plurality of Beaufort states that are set in the terminal device in advance on the basis of the (Continued)

ship characteristic data. The terminal device displays a graph that displays the relationship between rotation speed, ship speed and fuel consumption for each of a plurality of navigation conditions using the relationship data.

15 Claims, 12 Drawing Sheets

(51) Int. Cl.
  *G06F 3/14*    (2006.01)
  *G06T 11/20*   (2006.01)
  *G01C 21/20*   (2006.01)
  *B63J 99/00*   (2009.01)
(52) U.S. Cl.
  CPC ...... *G06T 11/206* (2013.01); *B63H 2025/045* (2013.01); *B63J 2099/008* (2013.01)

(56) References Cited

OTHER PUBLICATIONS

International Search Report issued in corresponding International Application No. PCT/JP2013/076345, dated Dec. 23, 2014, pp. 1-3.

* cited by examiner

SHIP ID:XXXX

| FORWARD DRAFT (m) | AFTER DRAFT (m) | WIND DIRECTION (deg.) | WIND SPEED (m/sec) | WAVE DIRECTION (deg.) | WAVE HEIGHT (m) | WAVE PERIOD (sec) |
|---|---|---|---|---|---|---|
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |

| ROTATION SPEED (rpm) | SHIP SPEED (knot) | FUEL CONSUMPTION (ton/day) | FUEL CONSUMPTION (ton/mile) | MAIN ENGINE LOAD (%) | SLIP (%) |
|---|---|---|---|---|---|
| ... | ... | ... | ... | ... | ... |
| ... | ... | ... | ... | ... | ... |
| ... | ... | ... | ... | ... | ... |
| ... | ... | ... | ... | ... | ... |

FIG. 4

SHIP ID:XXXX

| DATE AND TIME | FORWARD DRAFT (m) | AFTER DRAFT (m) | WIND DIRECTION (deg.) | WIND SPEED (m/sec) | WAVE DIRECTION (deg.) | WAVE HEIGHT (m) | WAVE PERIOD (sec) |
|---|---|---|---|---|---|---|---|
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |

| ROTATION SPEED (rpm) | SHIP SPEED (knot) | FUEL CONSUMPTION (ton/day) | FUEL CONSUMPTION (ton/mile) | MAIN ENGINE LOAD (%) | SLIP (%) |
|---|---|---|---|---|---|
| ... | ... | ... | ... | ... | ... |
| ... | ... | ... | ... | ... | ... |
| ... | ... | ... | ... | ... | ... |
| ... | ... | ... | ... | ... | ... |

Figure 11:
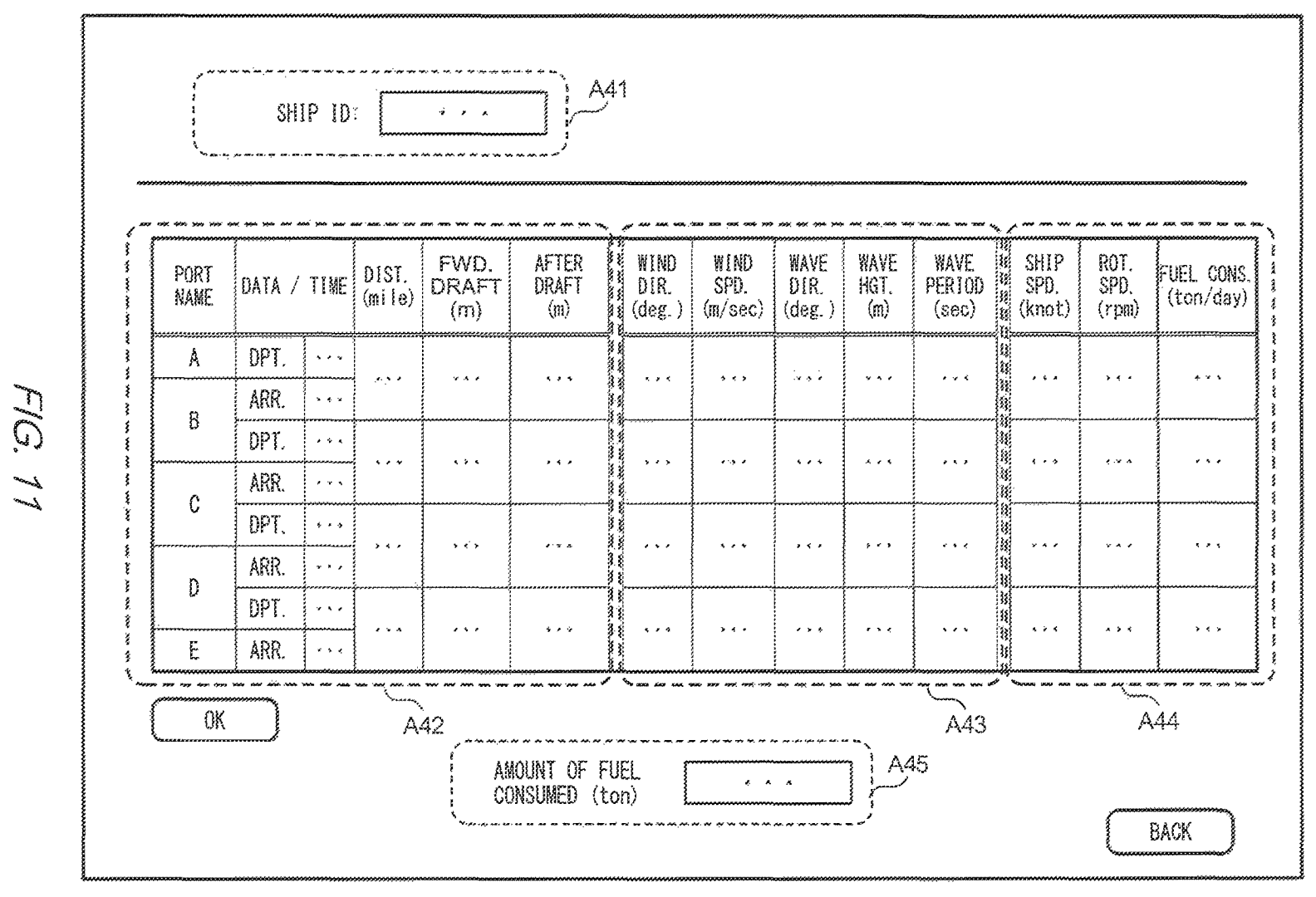

| PORT NAME | DATA / TIME | DIST. (mile) | FWD. DRAFT (m) | AFTER DRAFT (m) | WIND DIR. (deg.) | WIND SPD. (m/sec) | WAVE DIR. (deg.) | WAVE HGT. (m) | WAVE PERIOD (sec) | SHIP SPD. (knot) | ROT. SPD. (rpm) | FUEL CONS. (ton/day) |
|---|---|---|---|---|---|---|---|---|---|---|---|---|
| A | DPT. ... | ... | ... | ... | ... | ... | ... | ... | ... | ... | ... | ... |
| B | ARR. ... | | | | | | | | | | | |
| B | DPT. ... | ... | ... | ... | ... | ... | ... | ... | ... | ... | ... | ... |
| C | ARR. ... | | | | | | | | | | | |
| C | DPT. ... | ... | ... | ... | ... | ... | ... | ... | ... | ... | ... | ... |
| D | ARR. ... | | | | | | | | | | | |
| D | DPT. ... | ... | ... | ... | ... | ... | ... | ... | ... | ... | ... | ... |
| E | ARR. ... | | | | | | | | | | | |

SHIP ID: ...

AMOUNT OF FUEL CONSUMED (ton): ...

| DATE AND TIME | SEA AREA | WIND DIRECTION (deg.) | WIND SPEED (m/sec) | WAVE DIRECTION (deg.) | WAVE HEIGHT (m) | WAVE PERIOD (sec) |
|---|---|---|---|---|---|---|
| . . . | . . . | . . . | . . . | . . . | . . . | . . . |
| . . . | . . . | . . . | . . . | . . . | . . . | . . . |
| . . . | . . . | . . . | . . . | . . . | . . . | . . . |
| . . . | . . . | . . . | . . . | . . . | . . . | . . . |

*FIG. 14*

DATA-PROCESSING DEVICE, PROGRAM, RECORDING MEDIUM AND DATA-PROCESSING METHOD FOR GENERATION OF DATA THAT INDICATES NAVIGATION PERFORMANCE OF SHIP

TECHNICAL FIELD

The present invention pertains to a technology for generating data that indicates navigation performance of a ship.

BACKGROUND ART

In the navigation of a ship, a time of arrival at a destination and an amount of fuel consumed are affected mainly by selection of a navigation route and selection of a number of rotations (simply referred to as "rotation speed" in the present application) of a propeller per unit time at each point during navigation. Accordingly, the shipping manager, ship operator or the like of a ship requires a technology by which a ship arrives at a destination at a desired time, and selection of navigation route or number of rotations of the propeller for minimizing fuel consumption is supported.

As an example of a technology that meets the needs of the foregoing requirement, JP2013-107488A suggests a technique in which a navigation route having the lowest fuel consumption is automatically calculated as the optimum navigation route on the basis of the marine weather around the time of ship navigation and individual ship performance data that indicates individual ship performance; namely, smooth underwater performance, in-ocean-wave performance and in-wind performance of a ship.

SUMMARY OF THE INVENTION

The navigation performance of a ship is basically summarized into a relationship between the rotation speed of the propeller that drives the ship and navigation speed, a relationship between the rotation speed of the propeller and fuel consumption, or a relationship between the navigation speed obtained via the rotation speed of the propeller and fuel consumption. Data indicating the aforementioned relationships become necessary when selecting the rotation speed of the propeller in the navigation of a ship.

In the present application, fuel consumption signifies the amount of fuel consumed by a ship per unit time or per unit navigation distance. In the following explanation, as an example, fuel consumption is set to signify an amount of fuel consumed per unit time such as ton/day, but fuel consumption signifying an amount of fuel consumed per unit navigation distance such as ton/mile may also be adopted.

Conventionally, as data indicating the navigation performance of a ship, data indicating a relationship between rotation speed of a propeller and navigation speed, a relationship between rotation speed of the propeller and main-engine horse power and a relationship between main-engine horse power and fuel consumption is provided by ship manufacturers and the like. This data is measurement data obtained at the time of a test run or performance data obtained in ideal conditions without wind or waves.

Data provided by ship manufacturers and the like such as that described above indicates the navigation performance of a ship under limited conditions. The draft or trim of a ship changes in accordance with loading state, and in navigation in an actual sea area in which wind and wave states vary, data provided by ship manufacturers and the like cannot be used as is. Accordingly, concerning actual navigation of a ship, when a shipping manager plans an operation schedule or a ship operator determines a rotation speed of the propeller, data provided by the ship manufacturers and the like is interpreted and amended on the basis of experience and the like. Such human amendments are not always sufficiently accurate, and impose a great burden on shipping managers, ship operators or the like.

In view of matters such as those described above, the purpose of the present invention is to provide data that indicates navigation performance of a ship that can be used in navigation in an actual sea area in which the state of draft and trim or wind and waves vary.

To solve the foregoing problem, the present invention provides a data-processing device comprising a ship characteristic data acquisition means for acquiring ship characteristic data that indicates characteristics pertaining to the navigation of one ship, a wind/wave state data acquisition means for acquiring wind/wave state data that indicates the state of wind and/or waves the one ship receives during navigation, a relationship data generation means for generating, on the basis of the ship characteristic data, relationship data that indicates the relationship between two or more indicators from among a rotation speed indicator that indicates the level of the rotation speed of the propeller that drives the one ship when the one ship is navigated under the wind and/or wave state indicated by the wind/wave state data, a fuel consumption indicator that indicates whether the fuel consumption is the amount of fuel consumed by the one ship per unit time or per unit navigation distance, a ship speed indicator that indicates the level of the navigation speed of the one ship, a load indicator that indicates the level of the load on the propulsion device of the one ship, and a navigation efficiency indicator that indicates the level of the navigation efficiency of the one ship, and an output means for outputting the relationship data or data generated using the relationship data.

The abovementioned data-processing device may be configured such that the data processing device comprises a draft condition data acquisition means for acquiring draft condition data that indicates a draft condition of the one ship, wherein the ship characteristic data acquisition means acquires ship characteristic data that indicates characteristics pertaining to navigation of the one ship in the draft condition indicated by the draft condition data.

The data-processing device may also be configured such that the wind/wave state data acquisition means acquires two or more items of the wind/wave state data, the relationship data generation means generates relationship data pertaining to the two or more items of the wind/wave state data, the data processing device comprises a graph data generation means that generates graph data that illustrates a graph that represents a relationship between two or more of the rotation speed indicator, the fuel consumption indicator, the ship speed indicator, the load indicator and the navigation efficiency indicator indicated by the relationship data corresponding to each of the two or more items of the wind/wave state data is provided, and the output means outputs the graph data.

The data-processing device may also be configured such that the graph data generation means generates graph data that indicates the graph, which illustrates a range in which the propulsion device of the one ship can be used safely under the wind and/or wave state indicated by the wind/wave state data.

The data-processing device may also be configured such that the data-processing device comprises a rotation speed indication data acquisition means for acquiring rotation speed indication data that indicates a speed indicator that indicates whether the rotation speed of the propeller that drives the one ship is fast or slow, and an indication data generation means for generating indication data that indicates any of the fuel consumption indicator, ship speed indicator, load indicator or navigation efficiency indicator corresponding to the rotation speed indicated by the rotation speed indication data in accordance with the relationship data are provided, wherein the output means outputs the indication data or data generated using the indication data.

The data-processing device may also be configured such that the wind/wave state data acquisition means acquires two or more items of the wind/wave state data, and the indication data generation means calculates the probability of occurrence of the wind and/or wave state indicated by the two or more items of the wind/wave state data and generates data that indicates the probability of occurrence of any of the fuel consumption indicator, ship speed indicator, load indicator or navigation efficiency indicator on the basis of said probability of occurrence.

The data-processing device may also be configured such that the data-processing device comprises a fuel consumption indication data acquisition means for acquiring fuel consumption indication data that indicates a fuel consumption indicator that indicates the level of the fuel consumption, which is the amount of fuel consumed per unit time or per unit navigation distance by the one ship, and an indication data generation means for generating indication data that indicates any of the rotation speed indicator, ship speed indicator, load indicator or navigation efficiency indicator corresponding to the fuel consumption indicator indicated by the fuel consumption indication data in accordance with the relationship data are provided, wherein the output means outputs the indication data or data generated using the indication data.

The data-processing device may also be configured such that the data-processing device comprises the wind/wave state data acquisition means acquires two or more items of the wind/wave state data, and the indication data generation means calculates the probability of occurrence of the wind and/or wave state indicated by the two or more items of the wind/wave state data and generates data that indicates the probability of occurrence of any of the rotation speed indicator, ship speed indicator, load indicator or navigation efficiency indicator on the basis of said probability of occurrence.

The data-processing device may also be configured such that the data-processing device comprises a ship speed indication data acquisition means for acquiring ship speed indication data that indicates a ship speed indicator that indicates the level of the navigation speed of the one ship, and an indication data generation means for generating indication data that indicates any of the fuel consumption indicator, rotation speed indicator, load indicator or navigation efficiency indicator corresponding to the ship speed indicator indicated by the ship speed indication data in accordance with the relationship data are provided, wherein the output means outputs the indication data or data generated using the indication data.

The data-processing device may also be configured such that the wind/wave state data acquisition means acquires two or more of the wind/wave state data, and the indication data generation means calculates the probability of occurrence of the wind and/or wave state indicated by the two of more of the wind/wave state data and generates data that indicates the probability of occurrence of any of the fuel consumption indicator, rotation speed indicator, load indicator or navigation efficiency indicator on the basis of said probability of occurrence.

The data-processing device may also be configured such that the data-processing device comprises a reference ship characteristic data acquisition means for acquiring reference ship characteristic data that indicates characteristics that are used as a reference pertaining to the navigation of the one ship, an actual ship characteristic data acquisition means for acquiring actual ship characteristic data that indicates the actual characteristics of navigation that has previously been performed by the one ship, and a ship characteristic data generation means for generating the ship characteristic data on the basis of the reference ship characteristic data and the actual ship characteristic data are provided.

Further, the present invention provides a program for causing a computer to execute a process for acquiring ship characteristic data that indicates characteristics pertaining to the navigation of one ship, a process for acquiring wind/wave state data that indicates the states of wind and wave received during the navigation of the one ship, a process for generating, on the basis of the ship characteristic data, relationship data that indicates the relationship between two or more indicators from among a rotation speed indicator that indicates the level of the rotation speed of the propeller that drives the one ship when the one ship is navigated under the wind and/or wave state indicated by the wind/wave state data, a fuel consumption indicator that indicates whether the fuel consumption which is the amount of fuel consumed by the one ship per unit time or per unit navigation distance, a ship speed indicator that indicates the level of the navigation speed of the one ship, a load indicator that indicates the level of the load on the propulsion device of the one ship, and a navigation efficiency indicator that indicates the level of the navigation efficiency of the one ship, and a process for outputting the relationship data or data generated using the relationship data.

The present invention also provides a computer-readable recording medium that continuously records a program for causing a computer to execute a process for acquiring ship characteristic data that indicates characteristics pertaining to the navigation of one ship, a process for acquiring wind/wave state data that indicates the states of wind and wave received during the navigation of the one ship, a process for generating, on the basis of the ship characteristic data, relationship data that indicates the relationship between two or more indicators from among a rotation speed indicator that indicates the level of the rotation speed of the propeller that drives the one ship when the one ship is navigated under the wind and/or wave state indicated by the wind/wave state data, a fuel consumption indicator that indicates whether the fuel consumption which is the amount of fuel consumed by the one ship per unit time or per unit navigation distance, a ship speed indicator that indicates the level of the navigation speed of the one ship, a load indicator that indicates the level of the load on the propulsion device of the one ship, and a navigation efficiency indicator that indicates the level of the navigation efficiency of the one ship, and a process for outputting the relationship data or data generated using the relationship data.

The present invention also provides a data-processing method comprising a step in which a data-processing device acquires ship characteristic data that indicates characteristics pertaining to the navigation of one ship, a step in which the data-processing device acquires wind/wave state data that indicates wind and wave states received by the one ship during navigation, a step in which the data-processing device generates, on the basis of the ship characteristic data, relationship data that indicates the relationship between two or more indicators from among a rotation speed indicator that indicates the level of the rotation speed of the propeller that drives the one ship when the one ship is navigated under the wind and/or wave state indicated by the wind/wave state data, a fuel consumption indicator that indicates whether the fuel consumption is the amount of fuel consumed by the one ship per unit time or per unit navigation distance, a ship speed indicator that indicates the level of the navigation speed of the one ship, a load indicator that indicates the level of the load on the propulsion device of the one ship, and a navigation efficiency indicator that indicates the level of the navigation efficiency of the one ship, and a step in which the data-processing device outputs the relationship data or data generated using the relationship data.

According to the present invention, data that indicates performance pertaining to the navigation speed of a ship in an actual sea area in which the wind or wave states change to various states or performance pertaining to fuel consumption can be acquired. Data acquired as such is, for example, output to a display and read by a shipping manager, ship operator or the like when establishing a navigation schedule or adjusting the rotation speed of the propeller, or output to an engine control device of the ship and used to control the rotation speed of the propeller. As a result, compared to conventional methods, a navigation that is more desirable to a shipping manager, ship operator or the like can be realized.

BRIEF EXPLANATION OF THE DRAWINGS

FIG. 4 A drawing illustrating the data configuration of the reference ship characteristic data stored by the storage means of the terminal device as in one embodiment.

FIG. 5 A drawing illustrating the data configuration of the actual ship characteristic data stored in the storage means of the terminal device as in one embodiment.

FIG. 9 A drawing illustrating a fuel consumption constant control screen displayed on the terminal device as in one embodiment.

FIG. 11 A drawing illustrating a service simulation screen displayed on the terminal device as in one embodiment.

FIG. 13 A drawing illustrating a service simulation screen displayed on the terminal device as in an alternative example.

FIG. 14 A drawing illustrating the data configuration of a wind/wave state database stored by the storage means of the terminal device as in an alternative example.

DETAILED DESCRIPTION

1. Embodiment

Figure 1:
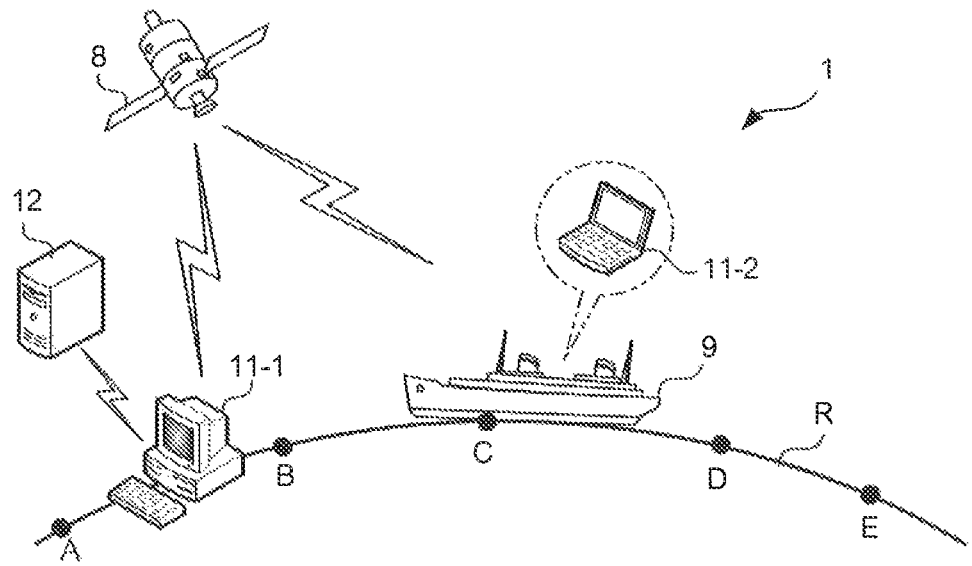
FIG. 1 A drawing illustrating the overall configuration of a ship performance display system as in one embodiment.

The configuration and operation of a ship performance display system 1 as in one embodiment of the present invention is explained hereinafter. FIG. 1 is a drawing that schematically illustrates the overall configuration of ship performance display system 1. Ship performance display system 1 is provided with a terminal device 11-1 operated by a shipping manager, for example, a terminal device 11-2 that is arranged on a ship 9 and operated by a ship operator, for example, and a meterologic/hydrographic information distribution server device 12 that transmits data pertaining to current or future wind and waves in a sea area specified in accordance with a transmission request from terminal device 11-1 or terminal device 11-2 (hereafter referred to as "wind/wave state data"). Terminal device 11-1 and meterologic/hydrographic information distribution server device 12 perform mutual data communication via a wired network, for example. Terminal device 11-2 and meterologic/hydrographic information distribution server device 12, and terminal device 11-2 and terminal device 11-1 perform mutual data communication via a communication satellite 8.

FIG. 1 exemplifies a state in which ship 9 departs a port A and navigates through a navigation route R that arrives at a port E via ports B, C and D.

Terminal device 11-1 and terminal device 11-2 are basically provided with the same configuration, and share a large number of similar operations. Accordingly, when terminal device 11-1 and terminal device 11-2 are not to be distinguished from one another hereafter, the terminal devices are collectively referred to as "terminal device 11." When the shipping manager or the like who is the user of terminal device 11-1 and ship operator or the like who is the user of terminal device 11-2 are not to be distinguished from one another, the shipping manager, ship operator or the like is simply referred to as a "user."

Figure 2:
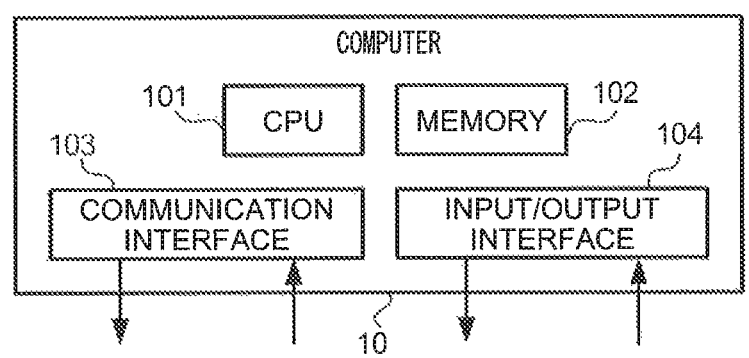
FIG. 2 A drawing illustrating the hardware configuration of a terminal device as in one embodiment.

The hardware configuration of terminal device 11 is a general computer provided with a communication means for performing data communication with other devices. FIG. 2 is a drawing illustrating the configuration of a computer 10 used as hardware of terminal device 11.

Computer 10 is provided with a CPU 101 that performs various types of operations in accordance with the OS or a program such as an application program while controlling other configuring parts, a memory 102 that stores the above-mentioned program and various types of data, a communication interface 103 that performs transmission/reception of various types of data with other devices, and an input/output interface 104 that performs input/output of various types of data with an operation device such as a keyboard or a mouse, for example, or a display (display device) or the like.

Figure 3:
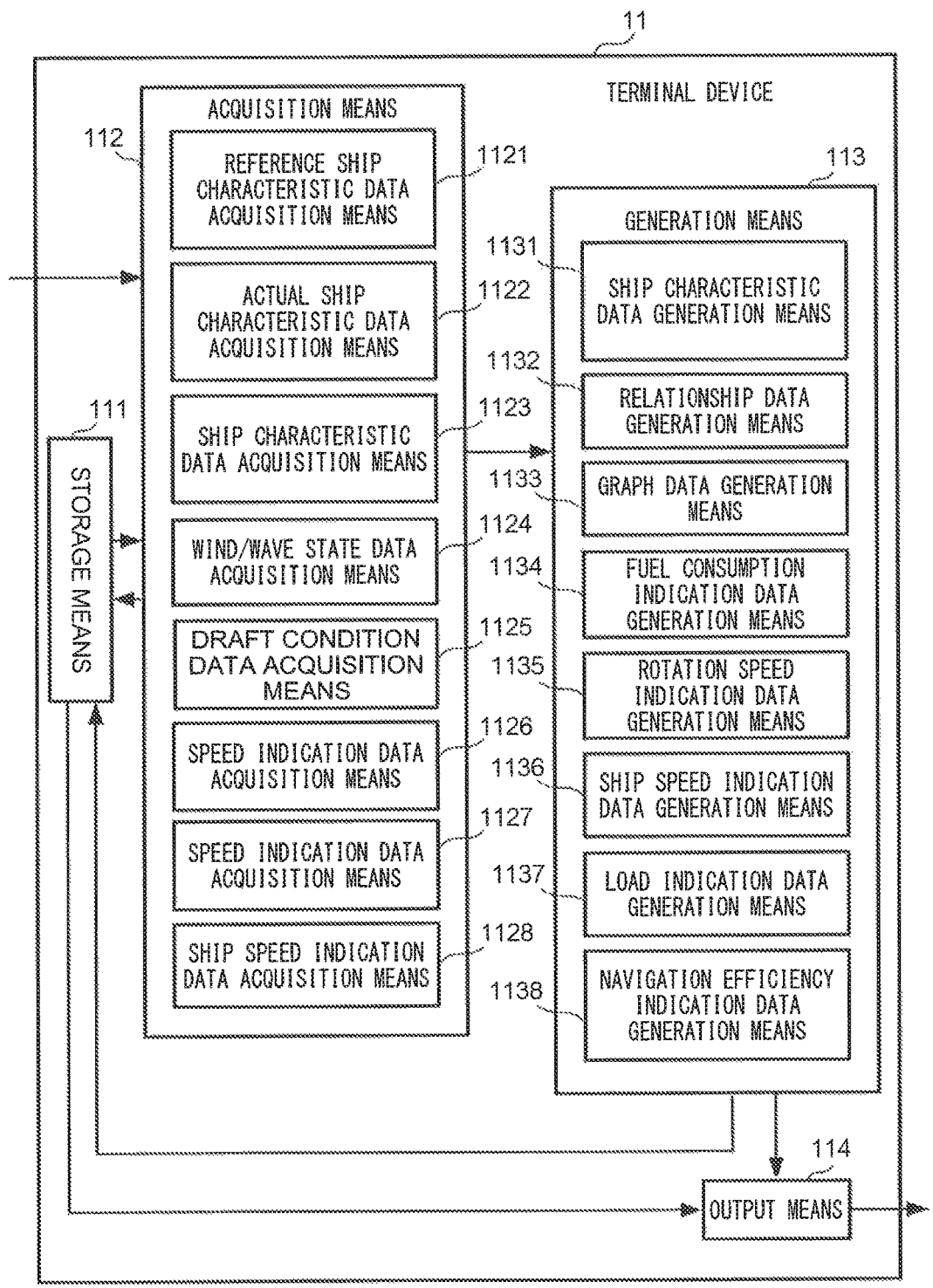
FIG. 3 A drawing illustrating the functional configuration of the terminal device as in one embodiment.

FIG. 3 is a drawing illustrating the functional configuration of terminal device 11. Terminal device 11 is provided with, as the functional configuration part, a storage means 111 for storing various types of data, an acquisition means for acquiring various types of data from an external device or storage means 111, a generation means 113 for generating various types of data using the various types of data acquired by acquisition means 112, and an output means 114 for outputting the various types of data generated by generation means 113 (or various types of data generated by generation means 113 and stored in storage means 111) to an external device such as a display. That is, computer 10, which is hardware of terminal device 11, functions as a device provided with the abovementioned storage means 111, acquisition means 112, generation means 113 and output means 114 by executing processes according to the application program for terminal device 11 as in the present embodiment.

Acquisition means 112 is provided firstly with a reference ship characteristic data acquisition means 1121 for acquiring reference ship characteristic data that indicates characteristics that serve as a reference pertaining to the navigation of ship 9 by reading said data from storage means 111. The reference ship characteristic data is data acquired by performing calculation on the basis of data such as type of ship, propeller and main engine pertaining to ship 9, for example. The data may also be data calculated by performing a simulation in accordance with data acquired on the basis of an actual ship measurement value, data acquired from a tank test on a model ship, and CFD (computational fluid dynamics).

FIG. 4 is a drawing illustrating the data configuration of the reference ship characteristic data stored in storage means 111. Storage means 111 stores reference ship characteristic data pertaining to each of a plurality of ships differentiated using a ship ID (identifier). The reference ship characteristic data is provided with a structure of a data table provided, as data fields, with "forward draft" (m), "after draft" (m), "wind direction" (deg.=degree), "wind speed" (m/sec), "wave direction" (deg.), "wave height" (m), "wave period" (sec), "rotation speed" (rpm), "ship speed" (knot), "fuel consumption" (ton/day), "fuel consumption" (ton/mile), "main engine load" (%) and "slip" (%). The units inside the brackets indicate the units of data stored in each of the data fields.

The main engine indicates the drive engine of the propulsion device of the ship, and the main engine load (%) is a representation of the ratio of the load on the main engine with respect to the entire load as a percentage. The main engine load is one example of an indicator that indicates the level of the load on the propulsion device (load indicator) and, for example, another load indicator such as an indicator that indicates the level of the load on the propulsion device including an auxiliary engine and the like may also be used in place of the main engine load.

The slip (%) is an indicator represented by the below formula, and is a representation of the difference between the theoretical travel distance of the ship calculated by multiplying the rotation speed by the propeller pitch and the actual travel distance of the ship as a percentage using the theoretical travel distance of the ship as a reference. Accordingly, the slip is one example of an indicator that indicates the level of the navigation efficiency (navigation efficiency indicator), and the larger the value thereof, the lower the navigation efficiency of the ship.

$$\text{Slip (\%)} = (1 - (\text{ship speed} \times 1852)/(\text{rotation speed} \times \text{propeller pitch} \times 60)) \times 100 \qquad a.$$

Data indicating the state during navigation of ship 9 is stored in the "forward draft" to "wave period" of the data fields of the reference ship characteristic data. Hereafter, the data group stored in said data fields are collectively referred to as "navigation state data." Data indicating the ship speed when ship 9 is navigated at the rotation speed of the propeller indicated in the data field "rotation speed" under the state indicated by the navigation state data of the same data record is stored in the data field "ship speed" of the reference ship characteristic data. Data indicating the fuel consumption, main engine load and slip when ship 9 is navigated at the rotation speed of the propeller indicated in the data field "rotation speed" under the conditions indicated by the navigation state data of the same data record is stored in the data fields "fuel consumption" (ton/day or ton/mile), "main engine load" and "slip."

The data record of the reference ship characteristic data is data corresponding to each of a combination of a representative value of the forward draft (for example, . . . 7 m, 7.5 m, 8 m, 8.5 m, 9 m, . . . ), representative value of the after draft (for example, . . . 7 m, 7.5 m, 8 m, 8.5 m, 9 m, . . . ), representative value of the wind direction (for example, 0 deg., 5 deg., 10 deg. . . . , 355 deg.), representative value of the wind speed (for example, 0 m/sec, 1 m/sec, 2 m/sec, . . . ), representative value of the wave direction (for example, 0 deg., 5 deg., 10 deg. . . . , 355 deg.), representative value of the wave height (for example, 0 m, 0.5 m, 1 m, . . . ), representative value of the wave period (for example, 0 sec, 1 sec, 2 sec, . . . ), and representative value of the rotation speed (for example, 10 rpm, 11 rpm, 12 rpm, . . . ) (hereafter, each of said combinations is referred to as a "characteristic lattice point"). Accordingly, the data field "ship speed" stores data indicating the ship speed corresponding to the characteristic lattice point of the data record thereof, the data fields "fuel consumption" (ton/day or ton/mile), "main engine load" and "slip" store data indicating the fuel consumption, main engine load and slip corresponding to the characteristic lattice point of the data record thereof.

Referring again to FIG. 3, explanation of the functional configuration of terminal device 11 is continued. Acquisition means 112 is provided with an actual ship characteristic data acquisition means 1122 for acquiring actual ship characteristic data that indicates the actual characteristics during navigation that has previously been performed by ship 9, by reading the data from acquisition means 112. The actual ship characteristic data is data continuously measured by a variety of measuring devices such as a draft gauge, wind direction gauge and wind speed gauge during navigation of the ship 9 or data calculated on the basis of said data (fuel consumption and the like).

FIG. 5 is a drawing illustrating the data configuration of the actual ship characteristic data stored in storage means 111. The actual ship characteristic data is provided with a structure of a data table including, as data records, data generated per passing of a prescribed length of time such as every 10 minutes in ship 9, for example. The data fields provided by the actual ship characteristic data are similar to the data fields of the reference ship characteristic data excluding the addition of a data field "date and time." This data field "date and time" stores data that indicates the date and time at which data of the data fields "forward draft" to "slip" is measured (or calculated).

Referring once again to FIG. 3, explanation of the functional configuration of terminal device 11 is continued. Acquisition means 112 is provided with a ship characteristic data acquisition means 1123 for acquiring ship characteristic data by reading said data from storage means 111. The ship characteristic data is data generated by amending the reference ship characteristic data on the basis of the actual ship characteristic data, and is data that indicates characteristics that are closer to the actual characteristics of ship 9 than the characteristics of ship 9 indicated by the reference ship characteristic data. Since the data configuration of the ship characteristic data is equivalent to the data configuration of the reference characteristic data illustrated in FIG. 4, exemplification thereof is omitted.

Acquisition means 112 is further provided with a wind/wave state data acquisition means 1124 for acquiring wind/wave state data that indicates the states of wind and wave encountered (or expected to be encountered) during navigation of ship 9, a draft condition data acquisition means 1125 for acquiring draft condition data that indicates the forward draft and after draft during navigation of ship 9, a rotation speed indication data acquisition means 1126 for acquiring rotation speed indication data that indicates the rotation speed during navigation of ship 9, a fuel consumption data acquisition means 1127 for acquiring fuel consumption indication data that indicates the fuel consumption during navigation of ship 9, and a ship speed indication data acquisition means 1128 for acquiring ship speed indicator data that indicates the ship speed during navigation of ship 9.

According to the present embodiment, rotation speed indication data acquired by rotation speed indication data acquisition means 1126 is set as data that indicates actual rotation speed as one example of a rotation speed indicator that indicates the level of rotation speed, but another indicator that indicates the level of rotation speed (for example, an indicator that indicates the level of the speed in 10 stages, 1 to 10) may also be adopted as the rotation speed indicator in place of the actual rotation speed. Similarly, in the present embodiment, the fuel consumption indicator data acquired by fuel consumption data acquisition means 1127 is set as data that indicates actual fuel consumption as one example of a fuel consumption indicator that indicates the level of fuel consumption, but another indicator that indicates the level of fuel consumption (for example, an indicator that indicates the level of fuel consumption in 10 stages, 1 to 10) may also be adopted as the fuel consumption indicator in place of actual fuel consumption. Similarly, in the present embodiment, the ship speed indication data acquired by ship speed indication data acquisition means 1128 is set as data that indicates actual ship speed as one example of a ship speed indicator that indicates the level of ship speed, but another indicator that indicates the level of ship speed (an indicator that indicates the level of ship speed in 10 stages, 1 to 10) may also be adopted as the ship speed indicator in place of actual ship speed.

Generation means 113 is provided firstly with a ship characteristic data generation means 1131 for generating ship characteristic data by amending the reference ship characteristic data (FIG. 4) in accordance with the actual ship characteristic data (FIG. 5). Ship characteristic data generation means 1131 generates ship characteristic data by amending the reference ship characteristic data so as to be close to the characteristics indicated by the actual ship characteristic data in accordance with an extent to which the ship speed and fuel consumption at the navigation state and rotation speed indicated by the actual ship characteristic data deviates from the ship speed and fuel consumption at the same navigation state and rotation speed acquired by interpolating the characteristic lattice point indicated by the reference ship characteristic data, for example. When doing so, ship characteristic data generation means 1131 reflects the new data included in the actual ship characteristic data to be greater than the old data by multiplying the weight corresponding to new or old indicated by the data stored in the data field "date and time" of the actual ship characteristic data, for example. As a result, the ship characteristic data becomes data that indicates characteristics that are closer to the current characteristics of ship 9, which constantly change due to the influence of fouling and the like on the hull, propeller and the like of ship 9.

Generation means 113 is provided with a relationship data generation means 1132 for generating relationship data that indicates the relationship between two or more of rotation speed, ship speed, fuel consumption, main engine load and slip (hereafter referred to as "performance parameters") when ship 9 is navigated under specific navigation conditions. For example, relationship data generation means 1132 calculates the relationship between wind direction, wind speed and the like indicated by the wind/wave state data acquired by wind/wave state data acquisition means 1124, and rotation speed and ship speed when ship 9 is navigated under navigation conditions specified by the forward draft and after draft indicated by the draft state data acquired by the draft condition data acquisition means 1125, the relationship between rotation speed and fuel consumption, the relationship between ship speed and fuel consumption, the relationship between ship speed and main engine load, the relationship between ship speed and slip, and the like, by interpolating the ship characteristic data. Relationship data generation means 1132 generates data that indicates the relationship between two or more performance parameters calculated as such as relationship data.

Further, generation means 113 is provided with a graph data generation means 1133 for generating graph data that indicates a graph that exemplifies the relationship between two or more performance parameters when ship 9 is navigated under specified navigation conditions in accordance with the relationship data generated by relationship data generation means 1132.

Generation means 113 is also provided with a fuel consumption indication data generation means 1134 for specifying a fuel consumption corresponding to the rotation speed indicated by the rotation speed indication data acquired by speed indication data acquisition means 1126 in accordance with the relationship data, and generating fuel consumption indication data that indicates said fuel consumption. Fuel consumption indication data generation means 1134 also specifies a fuel consumption corresponding to the ship speed indicated by the ship speed indication data acquired by ship speed indication data acquisition means 1128 in accordance with the relationship data, and generates fuel consumption indication data that indicates said fuel consumption.

Generation means 113 is also provided with a rotation speed indication data generation means 1135 for specifying a rotation speed corresponding to the fuel consumption indicated by the fuel consumption indication data acquired by speed indication data acquisition means 1127, and generating rotation speed indication data that indicates said rotation speed. Rotation speed indication data generation means 1135 also specifies a rotation speed corresponding to the ship speed indicated by the ship speed indication data acquired by ship speed indication data acquisition means 1128 in accordance with the relationship data, and generates rotation speed indication data that indicates said rotation speed.

Generation means 113 is also provided with a speed indication data generation means 1136 for specifying a ship speed corresponding to the rotation speed indicated by the rotation speed indication data acquired by speed indication data acquisition means 1125 in accordance with the relationship data, and generating ship speed indication data that indicates said ship speed. Ship speed indication data generation means 1136 also specifies a ship speed corresponding to the fuel consumption indicated by the fuel consumption indication data acquired by fuel consumption indication data acquisition means 1127 in accordance with the relationship data, and generates ship speed indication data that indicates said ship speed.

Generation means 113 is also provided with a load indication data generation means 1137 for specifying a main engine load corresponding to the rotation speed indicated by the rotation speed indication data acquired by rotation speed indication data acquisition means 1126 in accordance with the relationship data, and generating load indication data that indicates said main engine load. Load indication data generation means 1137 also specifies a main engine load corresponding to the fuel consumption indicated by the fuel consumption indication data acquired by speed indication data acquisition means 1127 or a main engine load corresponding to the ship speed indicated by the ship speed indication data acquired by the ship speed indication data acquisition means 1128 in accordance with the relationship data, and generates load indication data that indicates said main engine load.

Generation means 113 is also provided with a navigation efficiency indication data generation means 1138 for specifying a slip corresponding to the rotation speed indicated by the rotation speed indication data acquired by rotation speed indication data acquisition means 1126 in accordance with the relationship data, and generating navigation efficiency indication data that indicates said slip. Navigation efficiency indication data generation means 1138 also specifies a slip corresponding to the fuel consumption indicated by the fuel consumption indication data acquired by fuel consumption indication data acquisition means 1127 or a slip corresponding to the ship speed indicated by the ship speed indication data acquired by ship speed indication data acquisition means 1128 in accordance with the relationship data, and generates navigation efficiency indication data that indicates said slip.

Figure 6:
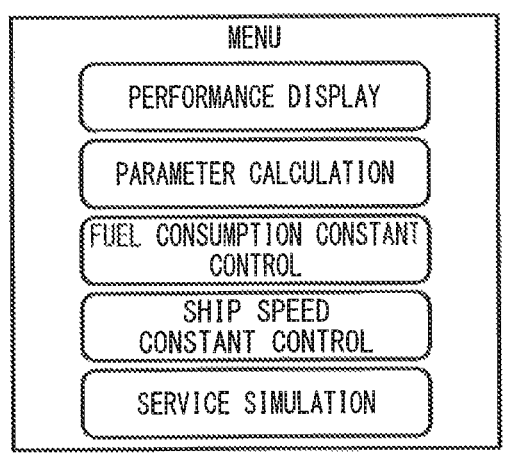
FIG. 6 A drawing illustrating a menu screen displayed on the terminal device as in one embodiment.

The preceding section is an explanation of the functional configuration of terminal device 11. Next, operation of ship performance display system 1 provided with the configuration described above is explained. A user operates terminal device 11 and displays a menu screen for using ship performance display system 1. FIG. 6 is a drawing illustrating the menu screen. On the menu screen, a "performance display" button, "parameter calculation" button, "fuel consumption constant control" button, "ship speed constant control" button and "service simulation" button are arranged as buttons for reading the services provided by ship performance display system 1.

Figure 7:
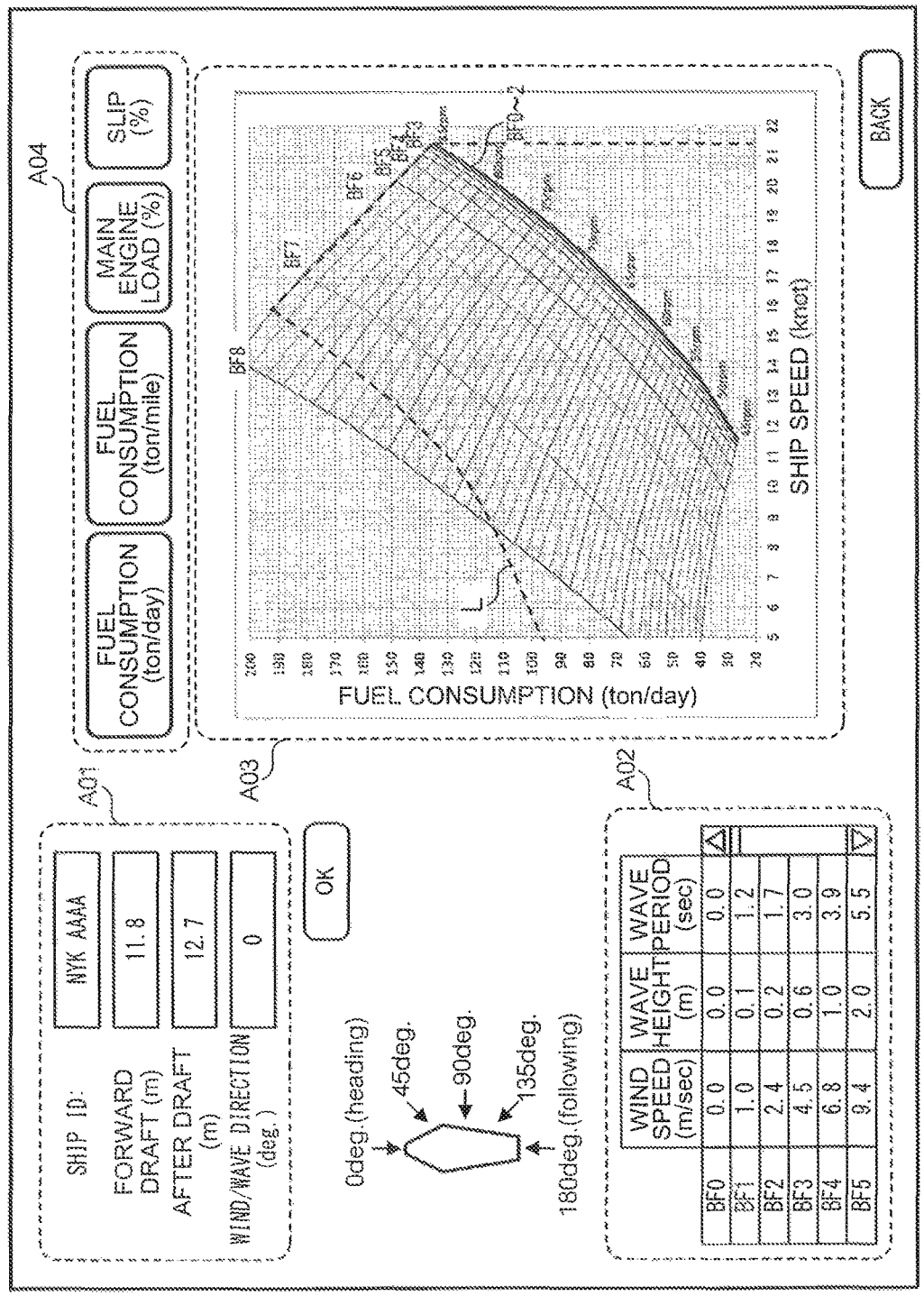
FIG. 7 A drawing illustrating a performance display screen displayed on the terminal device as in one embodiment.

If a user performs an operation of selecting the "performance display" button on the menu screen, terminal device 11 displays a performance display screen such as the screen illustrated in FIG. 7. The performance display screen is provided with a region A01 for accepting input of various parameters by a user, a region A02 for displaying a plurality of typical wind/wave state parameter groups that are set in advance, a region A03 for displaying a graph that indicates the performance of ship 9, and a region A04 for displaying buttons for specifying the performance parameters on the vertical axis of the graph displayed in region A03.

An input box for the ship ID of ship 9, an input box for the forward draft, an input box for the after draft, and an input box for the wind direction and wave direction are arranged in region A01. A user specifies a ship for which to perform performance display in region A03 while specifying the wind direction and wave direction from the draft state and wind/wave state of said ship by inputting data to the input boxes arranged in region A01. The present embodiment is configured so as not to make possible individual specification of wind direction and wave direction so as to minimize an amount of data required to be input by a user, but a configuration in which individual specification is possible may also be adopted.

A drawing illustrating whether the angle when specifying the wind direction and wave direction corresponds to the direction relating to the ship or the like is displayed below region A01.

Region A02 displays a combination of wind speed, wave height and wave period that indicates the wind/wave state (excluding wind direction and wave height) corresponding to each of 0, 1, 2, . . . on the Beaufort scale (displayed as "BF" in the graph). Parameters corresponding to said Beaufort scale are set in terminal device 11 in advance, and cannot be edited by a user in the present embodiment, but a configuration that allows editing by a user may also be adopted.

Region A03 simultaneously displays a graph corresponding to each of 6 Beaufort states displayed in region A02 and a graph corresponding to each of the representative values of the rotation speed. Firstly, the graph indicated by a curved line that curves up to the right coded with codes BF0 to BF8 is a graph corresponding to each of the Beaufort states, and indicates the relationship between the ship speed (horizontal axis) and fuel consumption (vertical axis) when ship 9 that is in a draft state specified by a user in region A1 is navigated in a state in which the wind and waves of the corresponding Beaufort are received in a direction specified by a used in region A01. FIG. 7 illustrates an example in which fuel consumption (ton/day) is selected as the performance parameter of the vertical axis, but a user can change the vertical axis to fuel consumption (ton/mile), main engine load or slip by operating the buttons in region A04.

For example, according to the graph exemplified in FIG. 7, it can be understood that, if ship 9 that is in a draft state specified in region A01 is navigated at a ship speed of 15 knots when wind and waves in the direction specified in region A01 are received at a strength of, for example, 5 on the Beaufort scale, the fuel consumption is approximately 75 ton/day.

Next, the graph indicated by a plurality of approximately straight lines that lower to the right in region A03 is a graph corresponding to each of the representative values (in the example in FIG. 7, the rotation speed per 1 rpm in a range of 45 to 85 rpm), and the intersection of the graph that ascends to the right and the graph that descends to the right indicates the ship speed and fuel consumption acquired when a service is carried out at a rotation speed that corresponds to the graph that descends to the left in the Beaufort corresponding to the graph that ascends to the right. For example, According to the graph exemplified in FIG. 7, it can be understood that, when a service of ship 9 that is in a draft state specified in region A01 is carried out at a rotation speed of 60 rpm in a state in which the wind and waves in the direction specified in region A01 is received at a strength of, for example, 5 on the Beaufort scale, the ship speed is approximately 13.8 knots, and the fuel consumption is approximately 62 ton/day.

Further, a boundary line L based on the engine characteristics of ship 9 is indicated in region A03. The region to the inside of boundary line L signifies that the engine can be used safely, and the region to the outside of boundary line L signifies that the engine is in a torque rich state, surging state or the like and cannot be used safely.

As described above, a user can intuitively know what kind of performance ship 9 indicates under various wind and wave states from the graph by only specifying draft state and wind direction and wave direction on the performance display screen. Further, a user can easily know the combination range of ship speed and fuel consumption that can be realized or range of rotation speed that can be achieved under the specified draft state and wind direction and wave direction.

As one example of the purpose of using the performance display screen, performing performance evaluation of a ship on the basis of data displayed on the performance display screen can be considered. In a conventional performance evaluation of a ship, performance is evaluated under one specific navigation state such as performance of a ship (relationship between rotation speed and ship speed, relationship between rotation speed and fuel consumption and the like) in a no wind and no wave state (Beaufort 0). With respect to this, the performance display screen displays performances under a different wind/wave state. Accordingly, more detailed performance evaluation of a ship such as a ship that indicates high performance even in rough weather becomes possible. The preceding section is an explanation of the service provided to a user on the performance display screen.

Figure 8:
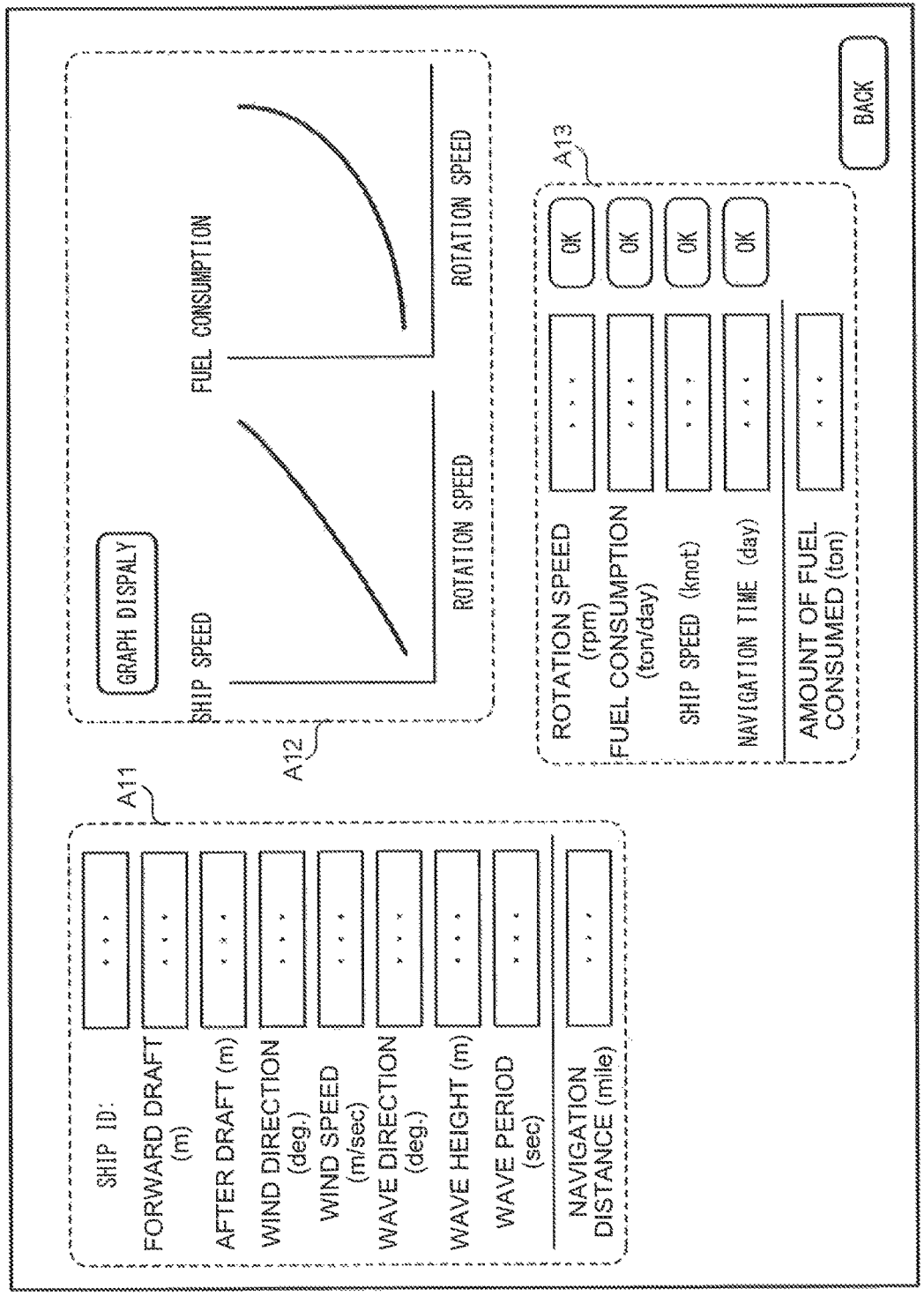
FIG. 8 A drawing illustrating a parameter calculation screen displayed on the terminal device as in one embodiment.

On the menu screen (FIG. 6), if a user performs an operation of selecting the "parameter calculation" button, terminal device 11 displays a parameter calculation screen such as the screen illustrated in FIG. 8. The parameter calculation screen is provided with a region A11 in which input boxes for a user to input a ship ID, various parameters indicating navigation state and navigation distance are arranged, a region A12 in which a graph that displays each of the relationship between rotation speed and ship speed and the relationship between rotation speed and fuel consumption when ship 9 is navigated under the navigation conditions specified in region A11 is arranged, a region A13 in which input boxes for a user to input any of the rotation speed, fuel consumption, ship speed and navigation time is arranged, and a region A14 in which a box for displaying the estimated value of the amount of fuel consumed when navigation is performed in accordance with the conditions input by a user in regions A11 and A13 is arranged.

A user inputs each parameter that indicates the ship ID and navigation state, and navigation distance in each of the input boxes arranged in region A11. For example, when a user wishes to have information on the amount of fuel consumed and the like of a navigation from port A to port B, the user accesses meterologic/hydrographic information distribution server device 12 using terminal device 11, for example, displays the predicted values of the wind and wave state in the sea area between port A and port B at the date and time at which navigation is planned, and inputs said predicted values in the corresponding input boxes in region A11 of the parameter calculation screen. The user researches the distance between port A and port B and inputs the distance to the corresponding input box in region A11 in the same manner.

If a user subsequently selects the "graph display" button arranged in region A12, the graph displayed in region A12 becomes updated to a graph that indicates the relationship between rotation speed and ship speed, and the relationship between the rotation speed and fuel consumption when ship 9 is navigated under the navigation conditions specified by the user in region A11.

Then, if a user, for example, inputs the rotation speed in the top input box and selects the "OK" button to the right thereof in region A13, the fuel consumption and ship speed corresponding to the rotation speed specified by the user are displayed in the second and third boxes in region A13 in accordance with the relationship between rotation speed and ship speed indicated in the graph in region A12. Further, the navigation time calculated on the basis of the navigation distance specified in region A11 and ship speed displayed in the third box in region A13 are displayed in the fourth box in region A13.

Furthermore, the amount of fuel consumed calculated on the basis of the fuel consumption displayed in the second box and navigation time displayed in the fourth box in region A13 are displayed in a box in region A14.

A user is able to display other parameters that were not input in region A13 and the amount of fuel consumed by inputting any of the fuel consumption, ship speed and navigation time in place of specifying the rotation speed as described above in region A13. Operation when said parameters are displayed is similar to the matter described above pertaining to when the rotation speed is specified.

As described above, a user can intuitively know the relationship between rotation speed and ship speed, and the relationship between rotation speed and fuel consumption when ship 9 is navigated under specified navigation conditions from a graph by specifying the navigation conditions on the parameter calculation screen. The user can also know the parameters that were not specified by specifying any of the rotation speed, fuel consumption, ship speed and navigation time. Further, the user can know the amount of fuel consumed required for navigation by specifying any of the rotation speed, fuel consumption, ship speed and navigation time.

The parameter calculation screen is useful when, for example, a shipping manager establishes a navigation schedule whilst confirming the amount of fuel consumed required for navigation in a specific section, when a ship operator wishes to know the rotation speed that should be set for ship 9 for ship 9 to arrive at a destination in accordance with the navigation schedule, or the like. The preceding section is an explanation of the service provided to a user on the parameter calculation screen.

Figure 9:
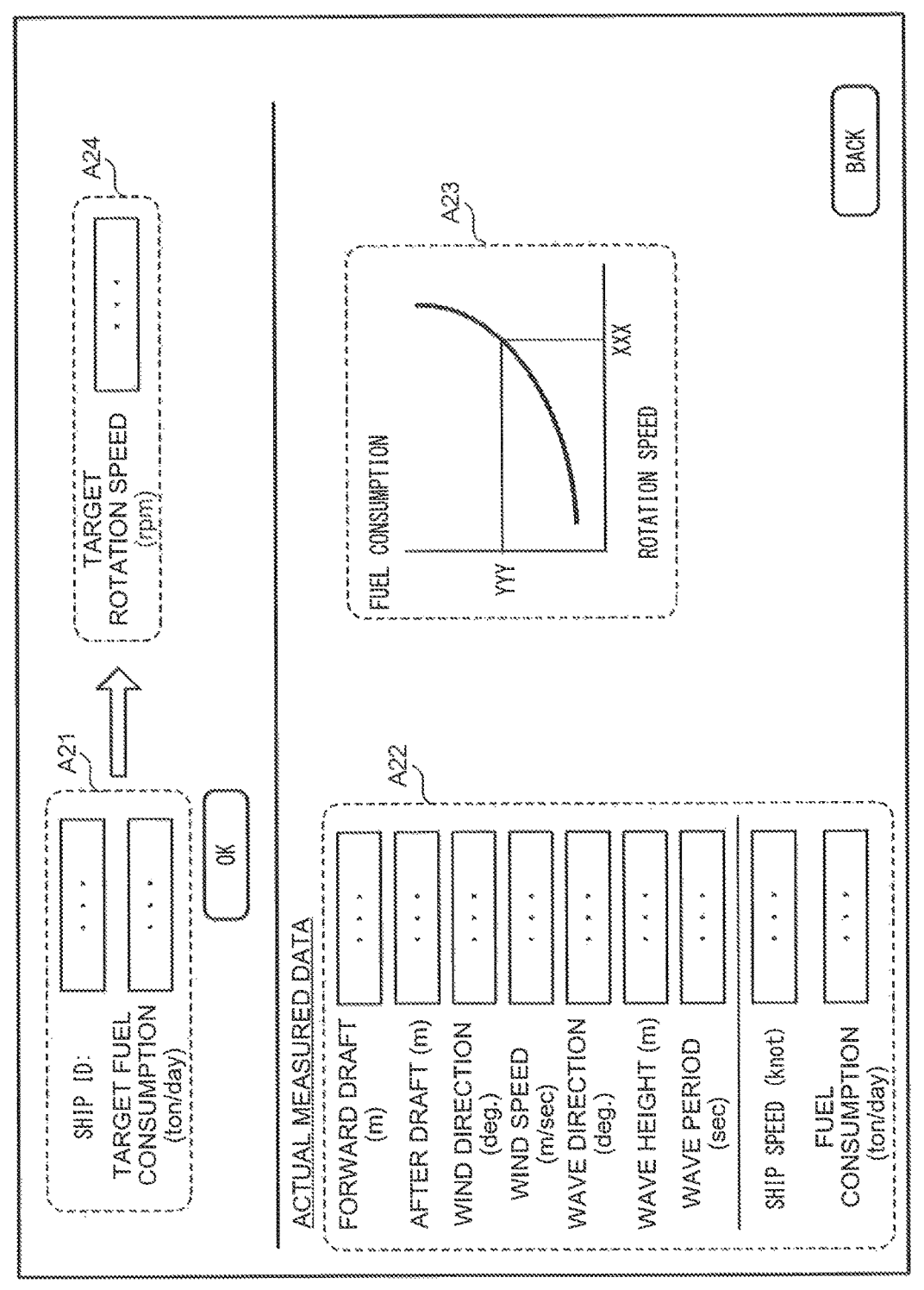

If a user performs an operation of selecting the "fuel consumption constant control" button on the menu screen (FIG. 6), terminal device 11 displays a fuel consumption constant control screen such as the screen illustrated in FIG. 9. The fuel consumption constant control screen is provided with a region A21 in which input boxes for a user to input the ship ID and target fuel consumption are arranged, a region A22 in which boxes for displaying the actual value of various types of parameters that indicate the current navigation state measured by various types of measuring devices provided on ship 9 are arranged, a region A23 in which a graph that indicates the relationship between rotation speed and fuel consumption when ship 9 is navigated under the navigation conditions displayed in region A22 is arranged, and a region A24 in which a box for displaying the rotation speed for achieving the target fuel consumption input by a user in region A21 as a target rotation speed in accordance with the relationship between rotation speed and fuel consumption indicated by the graph displayed in region A23 is arranged.

Region A23 exemplifies the target fuel consumption specified in region A21 and the target rotation speed displayed in region A24.

As described above, a user can know the rotation speed for realizing a target fuel consumption under the navigation conditions ship 9 is currently encountering (target rotation speed) by specifying the target fuel consumption on the fuel consumption constant control screen. Accordingly, for example, a ship operator can easily perform fuel consumption constant navigation by performing an operation on ship 9 so as to match the actual rotation speed of ship 9 to the target rotation speed displayed on the fuel consumption constant control screen.

Further, a configuration may also be adopted in which, for example, data that indicates the target rotation speed (rotation speed indication data) is output from terminal device 11-2 to the engine control device of ship 9, and the engine control device controls the engine so as to match the rotation speed to the target rotation speed input from terminal device 11-2. In such a case, driving of the engine of ship 9 is automatically controlled in accordance with the rotation speed indication data output from terminal device 11-2.

A configuration in which the target rotation speed is amended in the direction of reduction of deviation when a state in which the target fuel consumption specified in region A21 of the fuel consumption constant control screen and the actual measured fuel consumption (the fuel consumption displayed in region A22) deviate continues, for example, for a prescribed length of time or longer may also be adopted. Specifically, a configuration in which, when the target fuel consumption is set to 100 ton/day and the actual value (average value) of fuel consumption in a past prescribed period (for example, 30 minutes) calculated from an actual measured value is 110 ton/day, terminal device 11 performs a process of reducing the target rotation speed from 55 rpm to 53 rpm, for example. The preceding section is an explanation of the service provided on the fuel consumption constant control screen.

Figure 10:
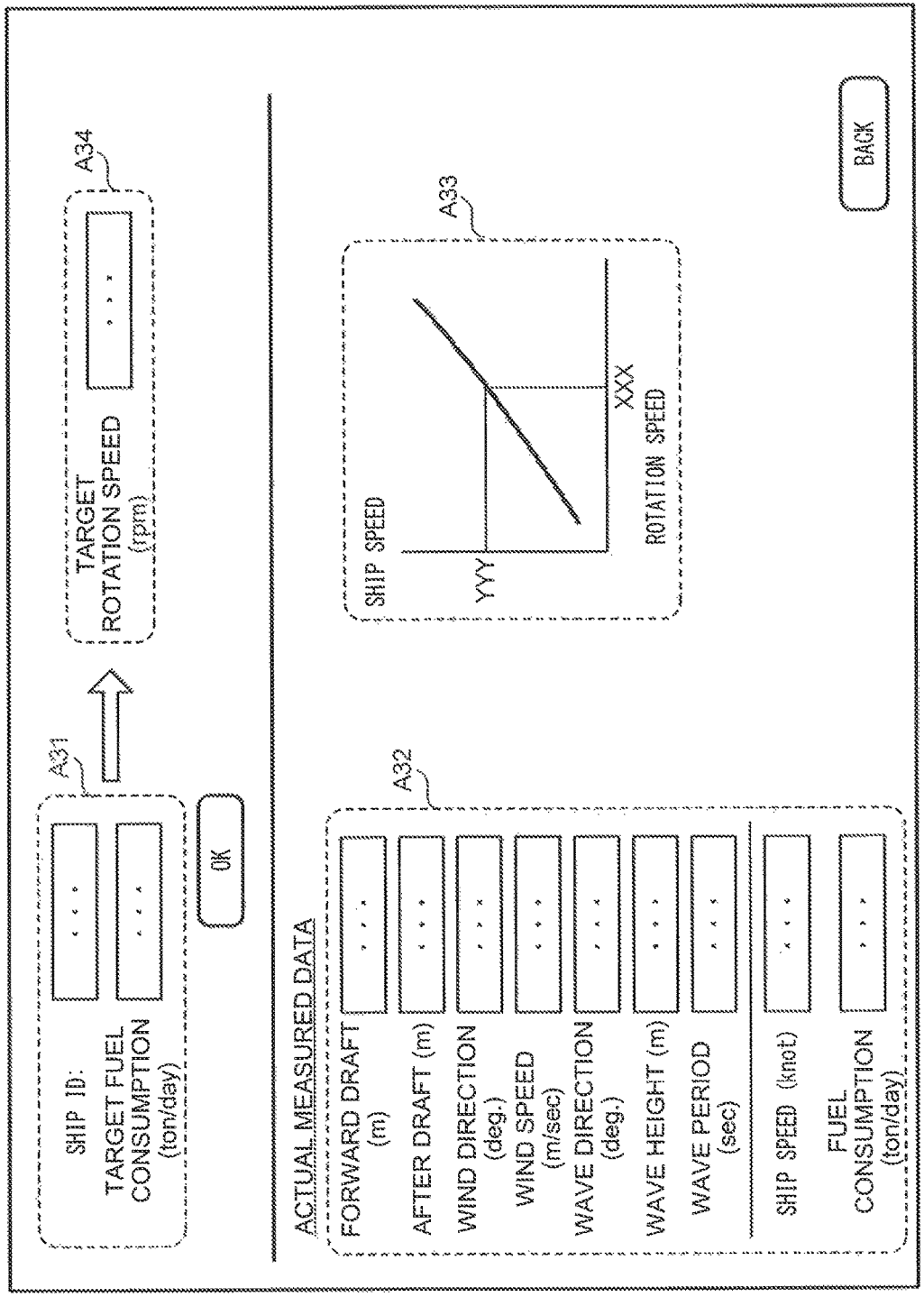
FIG. 10 A drawing illustrating a ship speed constant control screen displayed on the terminal device as in one embodiment.

If a user performs an operation of selecting the "ship speed constant control" button on the menu screen (FIG. 6), the terminal device displays a ship speed constant control screen such as the screen illustrated in FIG. 10. The ship speed constant control screen is the same as the fuel consumption constant control screen (FIG. 9) excluding a feature in which the target ship speed is set by a user in place of the target fuel consumption in region A31, and a feature in which the graph displayed in region A33 indicates the relationship between rotation speed and ship speed rather than the relationship between rotation speed and fuel consumption.

Since the method for operating and using the ship speed constant control screen is similar to the matter described above pertaining to the fuel consumption constant control screen excluding a feature in which fuel consumption is replaced with ship speed, explanation thereof is omitted.

A user can know the rotation speed for realizing the target ship speed (target rotation speed) under the navigation conditions currently encountered by ship 9 by specifying the target ship speed on the ship speed constant control screen. Accordingly, for example, a ship operator can easily perform ship speed constant navigation by performing an operation on ship 9 so as to match the actual rotation speed of ship 9 to the target rotation speed displayed on the ship speed constant control screen.

Further, a configuration in which driving of the engine of ship 9 is automatically controlled similarly to the case of the fuel consumption constant control screen by, for example, outputting data that indicates the target rotation speed (rotation speed indication data) from terminal device 11-2 to the engine control device of ship 9 may also be adopted.

Furthermore, the feature wherein a configuration so as to amend the target rotation speed in the direction that reduces deviation when the target ship speed and actual measured ship speed deviate may be adopted is similar to the case of the fuel consumption constant control screen. The preceding section is an explanation of the service provided on the ship speed constant control screen.

If a user performs an operation of selecting the "service simulation" button on the menu screen (FIG. 6), terminal device 11 displays a service simulation screen such as the screen illustrated in FIG. 11. A user such as a shipping manager can display the estimated value of the amount of fuel consumed in the entire navigation on the service simulation screen by specifying the navigation schedule that navigates via a plurality of ports and the draft state of ship 9 during navigation between each of the ports.

The service simulation screen is provided with a region A41 in which an input box for a user to input a ship ID is arranged, a region A42 for a user to input a variety of parameters pertaining to the navigation schedule (distances between ports, time of arrival and time of departure at each of the ports) and a parameter pertaining to the draft state during navigation between each of the ports (forward draft and after draft), a region A43 for displaying the various parameters such as wind direction and wind speed indicated by the wind/wave state data that terminal device 11 has acquired from meterologic/hydrographic information distribution server device 12 in accordance with the data that has been input in region A42, a region A44 for displaying the ship speed, rotation speed and fuel consumption calculated on the basis of the data input in region A42 and the data displayed in region A43, and a region A45 in which a box for displaying the estimated value of the amount of fuel consumed during the entire navigation when navigation is performed at the ship speed and fuel consumption displayed in region A44 is arranged.

Terminal device 11 requests wind/wave state data that indicates the wind/wave state in a section navigation route and navigation time zone to meterologic/hydrographic information distribution server device 12 for each of the section navigation routes between the ports on the basis of the time of departure and time of arrival input by a user in region A42, and displays various parameters that indicate the wind and wave state indicated by the wind/wave state data transmitted from meterologic/hydrographic information distribution server device 12 as a response to the request (wind direction, wind speed and the like) in the corresponding section of region A43. Then, terminal device 11 generates relationship data that indicates the relationship between rotation speed and ship speed and the relationship between rotation speed and fuel consumption when ship 9 is navigated under the navigation conditions specified by the draft state input by a user in region A42 and the wind/wave state displayed in region A43 for each of the section navigation routes between the ports.

Next, terminal device 11 calculates the ship speed during navigation of section navigation routes on the basis of the distance between the ports, time of departure from a port and time of arrival at a port input in region A42 by a user for each of the section navigation routes between ports, and displays the ship speed in the ship speed section of region A44. Then, terminal device 11 specifies the rotation speed corresponding to the ship speed displayed in region A44 and the fuel consumption corresponding to said rotation speed in accordance with relationship data generated previously for each of the section navigation routes between the ports, and displays the specified rotation speed and fuel consumption in the corresponding section of region A44. Further, terminal device 11 estimates the amount of fuel consumed per section navigation route by multiplying the navigation time specified by the time of departure from a port and time of arrival at a port input by a user in region A42 by the fuel consumption displayed in region A44 for each of the section navigation routes between ports, and estimates the amount of fuel consumed for the entire navigation by summing up the amounts of said fuel consumption. The thus estimated amount of fuel consumed for the entire navigation is displayed in the box in region A45.

As described above, a user can know the estimated value of amount of fuel consumed required by ship 9 for the entire navigation (the amount of fuel consumed that reflects the influence of the wind and wave state that ship 9 is predicted to encounter during navigation) by specifying the navigation schedule and draft state on the service simulation screen. Accordingly, for example, a shipping manager can adjust the navigation schedule whilst confirming, at any time, the estimated value of the amount of fuel consumed when navigation is performed in accordance with the navigation schedule after adjustment has been made on the service simulation screen. The preceding section is an explanation of the service provided on the service simulation screen.

As described above, since ship performance display system 1 displays or otherwise notifies the navigation performance of a ship under various navigation conditions specified by a user as relationships between a plurality of performance parameters, the user can accurately know the performance of the ship in an actual sea area, as well as being able easily to establish the navigation schedule or operate the ship in accordance with information such as fuel consumption, ship speed, rotation speed, main engine load and slip provided by ship performance display system 1 using said relationships.

Modified Examples

The embodiment described above may be modified into various embodiments within the scope of the technical ideas of the present invention. The modified examples are indicated below.

In the embodiment described above, the relationships between performance parameters when a ship is navigated in a wind and wave state corresponding to Beaufort states set in advance are displayed on a graph (FIG. 7) as a performance display screen. In addition to or in place of this, a performance display screen that displays the relationships between performance parameters corresponding to the wind and wave states specified separately by a user in terminal device 11, for example, may be provided.

Figure 12:
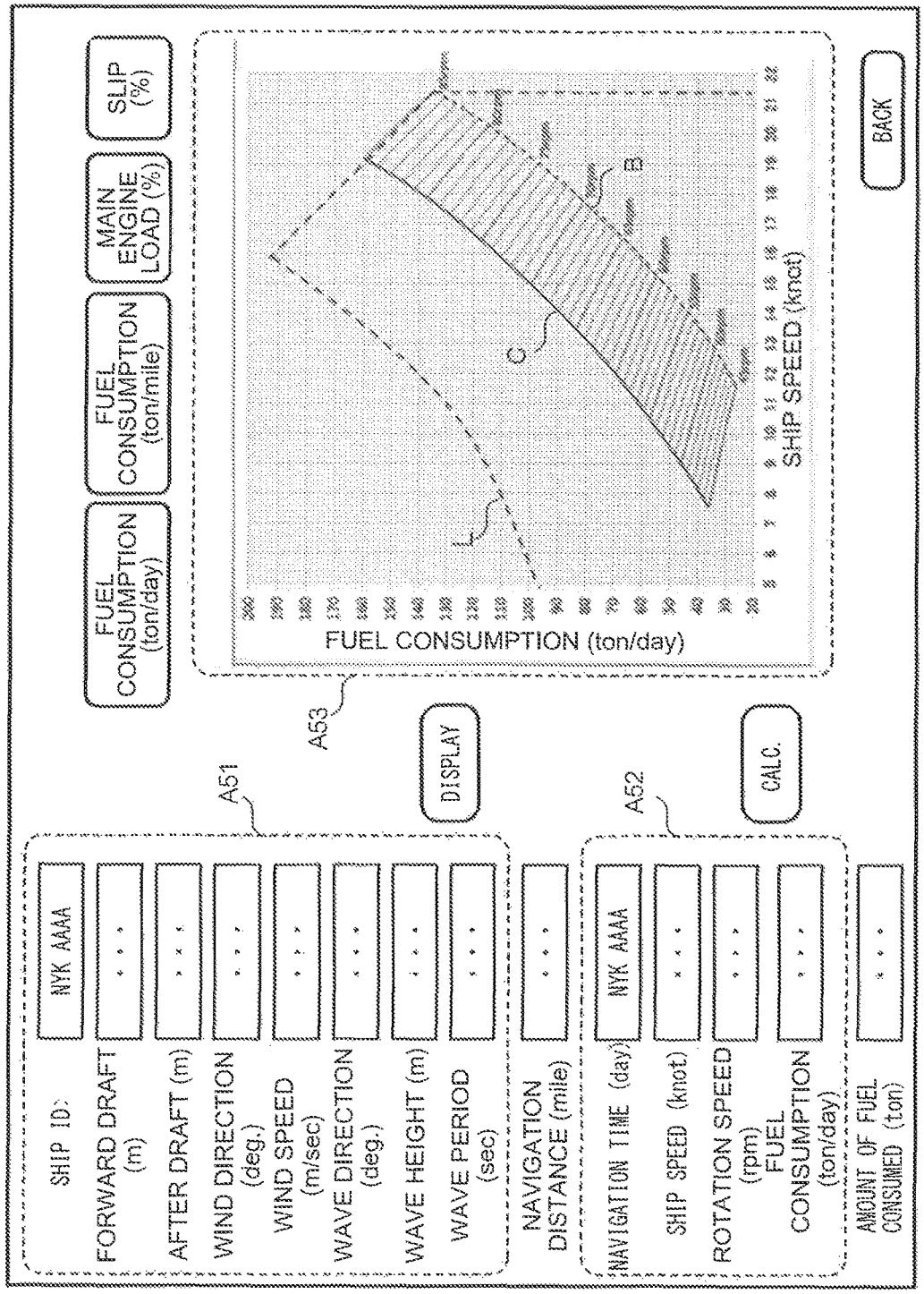
FIG. 12 A drawing illustrating a performance display screen displayed on the terminal device as in an alternative example.

FIG. 12 is a drawing illustrating the performance display screen as in an alternative example such as the example described above. Input boxes for wind direction and wave direction for making individual input possible are provided in region A51 of the performance display screen exemplified in FIG. 12 in addition to the wind direction and wave direction that could be input as one parameter on the performance display screen exemplified in FIG. 7. Input boxes that make possible individual input of wind speed, wave height and wave period that could not be input by a user in the performance display screen exemplified in FIG. 7 due to being specified by the Beaufort states are also provided in region A51.

A user can display a graph that indicates the relationships between performance parameters corresponding to the parameters in region A53 by operating the "display" button after inputting each of the parameters in the input boxes in region A51. In the graph displayed in region A53, line B indicates the relationship between performance parameters in a Beaufort 0 state, and line C indicates the relationship between parameters when navigation is performed in the wind and wave states specified in region A51.

The performance display screen exemplified in FIG. 12 is also provided with a function for estimating the amount of fuel consumed. If a user operates the "calculation" button after inputting data in the "navigation distance" input box and inputting data in any one of the "navigation time" to "fuel consumption" input boxes within region A52, terminal device 11 specifies data corresponding to the input boxes in which data was not input by the user in region A52 in accordance with the relationship data generated according to the parameters input in region A51, and displays the data thereof. For example, if a user operates the "calculation" button after inputting data in the "navigation distance" input box and the "navigation time" input box, the ship speed, rotation speed and fuel consumption when navigation is performed for a specified navigation distance in a specified navigation time under the conditions input in region A51 is displayed in the corresponding input boxes.

If a user operates the "calculation button," terminal device calculates the amount of fuel consumed using the data displayed in the "navigation time" input box and the "fuel consumption" input box in region A52, for example, and displays the calculated result in an "amount of fuel consumed" text box below region A52.

As such, a user can individually specify the wind and wave states on the performance display screen exemplified in FIG. 12 and intuitively know the relationships between performance parameters during navigation of a ship for said wind and wave states. A user can also easily know the estimated value of the amount of fuel consumption the ship requires for navigation for the individually specified wind and wave states.

(2) In the service simulation screen of the embodiment described above, wind/wave state data that indicates the wind and wave state in a time zone specified by the data input in the "time" section by a user on a navigation route specified by the data input in a "port name" section by a user is used. This wind/wave state data is data that terminal device 11 acquires from meteorologic/hydrographic information distribution server device 12, and usually indicates the estimated value of a parameter that indicates a future wind and wave state. In addition to or in place of this, a service simulation screen that presents ship speed, rotation speed, fuel consumption, navigation time, amount of fuel consumed and the like estimated using the wind/wave state data that indicates past wind and wave states may be provided to a user.

Figure 13:
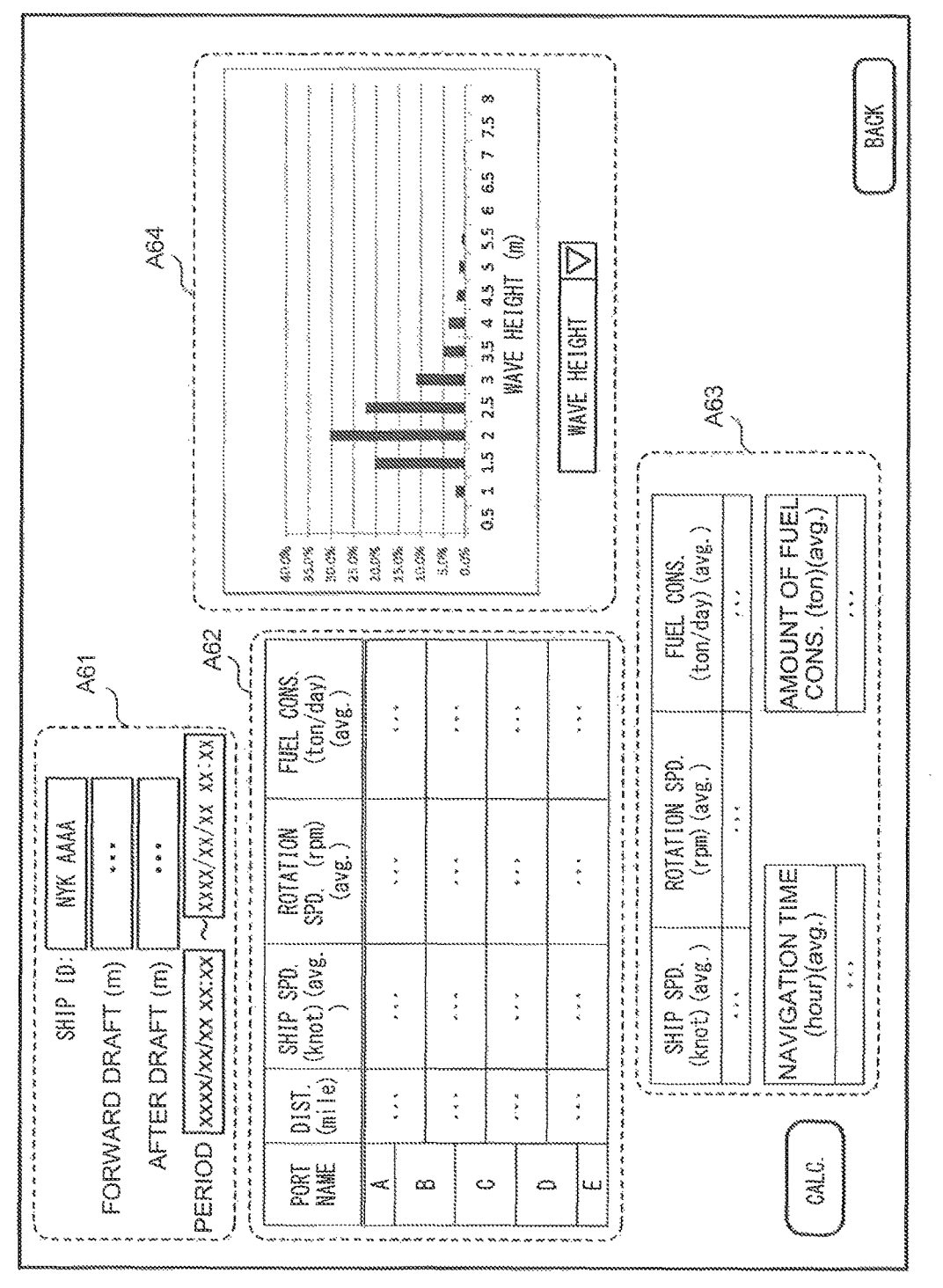

FIG. 13 is a drawing illustrating the service simulation screen as in an alternative example such as the example described above. FIG. 14 is a drawing illustrating the data configuration of the wind/wave state database stored in terminal device 11, for example, to generate data that is presented in the service simulation screen illustrated in FIG. 13. As illustrated in FIG. 14, wind/wave state data that indicates the wind and wave state such as wind direction, wind speed, wave direction, wave height and wave period in a specific sea area at a specific date and time in the past is recorded in the wind/wave state database for several preceding years, for example. The wind/wave state data recorded in the wind/wave state database may be, for example, data that indicates actual measured values on actual individual dates and times and sea areas, or data that indicates estimated values provided by meteorologic/hydrographic information distribution server device 12 in the past.

In the service simulation screen exemplified in FIG. 13, a user inputs the forward draft and after draft in the input boxes in region A61, and then inputs a period for extracting the wind/wave state data to be used. Then, if the user inputs data in the "port name" section of the table in region A62, the shortest distance between the ports that have been input is automatically displayed in the "distance" section. A user may arbitrarily input data in the "distance" section. Then, if a user inputs data in the "ship speed" section, "rotation speed" section or "fuel consumption" section of the table and operates the "calculation" button, a performance parameter corresponding to the sections of the table in which data has not been input by the user is automatically estimated by terminal device 11 and displayed. The estimated value of the ship speed, rotation speed, fuel consumption, navigation time and amount of fuel consumed for the entire navigation is automatically estimated by terminal device 11 in accordance with operation of the "calculation" button, and displayed in the text boxes in region A63.

Concerning the abovementioned estimation, terminal device 11 first extracts the wind/wave state data within the period specified by the data input in the "period" input box in region A61 and the sea area on the navigation route specified by the data input in the "port name" section of the table in region A62 from the wind/wave state database (FIG. 14). Then, terminal device 11 calculates the probability of occurrence per wind and wave parameter indicated by the extracted wind/wave state data.

The probability of occurrence per wind and wave parameter calculated by terminal device 11 or probability of occurrence of ship speed, rotation speed, fuel consumption, navigation time and amount of fuel consumed calculated by terminal device 11 using the generation probability thereof is displayed in region A64 of FIG. 13 as a histogram. A user can specify the type of parameter for which a histogram is displayed in region A64 by operating the menu box in region A64.

Terminal device 11 calculates the probability of occurrence per combination of wind and wave parameters using the probability of occurrence per wind and wave parameters. Then, terminal device 11 generates relationship data per combination of wind and wave parameters, and specifies other performance parameters (for example, rotation speed and fuel consumption) corresponding to the performance parameter input in the table in region A62 by a user (for example, ship speed). Then, terminal device 11 calculates the probability of occurrence of each of the performance parameters (ship speed, rotation speed, fuel consumption) by multiplying the performance parameters (ship speed, rotation speed, fuel consumption) specified for each of a variety of combinations of wind and wave parameters by the probability of occurrence of the combination of corresponding wind and wave parameters.

Then, terminal device 11 calculates the generation probability of the navigation time and amount of fuel consumed using the probability of occurrence of the performance parameters. For example, the probability of occurrence of the navigation time is calculated on the basis of the probability of occurrence of the distance and ship speed parameters indicated in the table in region A62. The probability of the amount of fuel consumed is calculated on the basis of the probability of occurrence of the fuel consumption and the probability of occurrence of the navigation time parameters. Terminal device 11 displays the histogram in region A64 in accordance with the probability of occurrence data that indicates the probability of occurrence calculated as such.

Terminal device 11 calculates the average value of the parameters by multiplying the probability of occurrence of the ship speed, rotation speed, fuel consumption, navigation speed and amount of fuel consumed calculated as described above by the values of the parameters thereof. The average value calculated as such becomes data that is displayed in regions A62 and A63.

Concerning the service simulation screen exemplified in FIG. 13, a user can know the fuel consumption, amount of fuel consumed and the like during navigation of a ship that is estimated on the basis of past wind/wave state data, and can know the probability of occurrence of the parameters thereof. In FIG. 13, the probability of occurrence of each of the parameters is set to be displayed as a histogram, but the probability of occurrence may also be output in another format such as a table format, for example.

(3) In the embodiment described above, a configuration in which each of terminal device 11-1 and terminal device 11-2 is provided with the functional configuration illustrated in FIG. 3 and generation of data for performing display of each type of service screen described above is performed by generation means 113 is adopted. In place of this, a configuration in which, for example, only either terminal device 11-1 or terminal device 11-2 is provided with the functional configuration illustrated in FIG. 3 and the terminal device 11 that is not provided with the functional configuration illustrated in FIG. 3 receives the data required for displaying each type of service screen from the other terminal device 11 and displays the data may be adopted. Further, a configuration in which neither terminal device 11-1 nor terminal device 11-2 is provided with the functional configuration illustrated in FIG. 3 and terminal 11 receives the data necessary for displaying each type of service screen from the server device provided with the functional configuration illustrated in FIG. 3 and displays the data may also be adopted.

(4) In the embodiment described above, the draft state data is set to indicate forward draft and after draft, but the configuration of the parameters can be modified to various configurations such as a configuration in which the draft state data indicates the draft at the centre of the bow and stern or a configuration in which the draft state data indicates forward draft and after draft of each of the starboard side and the port side of the ship, for example. Similarly, in the embodiment described above, the wind/wave state data is set to indicate wind direction, wind speed, wave direction, wave height and wave period, but the configuration of the parameters can be modified to various configurations such as a configuration in which wave spectrum is used in place of wave period, for example.

(5) In the embodiment described above, there is one item of wind/wave state data acquired from meterologic/hydrographic information distribution server device 12 on the service simulation screen (FIG. 11) per section navigation route between ports, and one parameter selected from among ship speed, rotation speed and fuel consumption calculated in accordance with the wind/wave state data per section navigation route between ports. In place of this, a configuration in which terminal device 11 acquires wind/wave state data from meteorologic/hydrographic information distribution server device 12 pertaining to each partial navigation route that is one route of the section navigation route that has been divided into a plurality of routes, and calculates the ship speed, rotation speed and fuel consumption per partial navigation route may be adopted.

(6) In the explanation of the embodiment described above, there is no particular mention of whether the navigation speed is the ship speed relative to ground or ship speed relative to water. Ship speed relative to ground or ship speed relative to water may be adopted as the navigation speed.

(7) In the embodiment described above, the reference ship characteristic data is set to be stored in terminal device 11 in advance, but in place of this, a configuration in which terminal device 11 acquires the reference ship characteristic data from another device such as a server device and uses the data may be adopted.

(8) In the embodiment described above, the wind/wave state data is set to be data that indicates the wind and wave state, but does not need to be data that indicates the state of both wind and wave, but can be data that indicates the state of wind and/or waves.

(9) In the embodiment described above, terminal device 11 is configured such that terminal device 11 is realized by executing a process according to an application program in a general computer. In place of this, terminal device 11 may be configured as a so-called exclusive device.

The present invention is grasped as each of a data-processing device exemplified in terminal device 11, a program for making a computer function as the data-processing device exemplified in terminal device 11, a computer-readable recording medium that continuously records said program, and a method of processing executed by the data-processing device exemplified in terminal device 11.

DESCRIPTION OF REFERENCE NUMERALS

1. . . ship performance display system, 8. . . communication satellite, 9. . . ship, 10. . . computer, 11. . . terminal device, 12. . . meteorologic/hydrographic information distribution server device, 101. . . CPU, 102. . . memory, 103. . . communication interface, 104. . . input/output interface, 111. . . storage means, 112. . . acquisition means, 113. . . generation means, 114. . . output means, 1121. . . reference ship characteristic data acquisition means, 1122. . . actual ship characteristic data acquisition means, 1123. . . ship characteristic data acquisition means, 1124 . . . wind/wave state data acquisition means, 1125. . . draft condition data acquisition means, 1126 . . . speed indication data acquisition means, 1127. . . speed indication data acquisition means, 1128 . . . ship speed indication data acquisition means, 1131. . . ship characteristic data generation means, 1132. . . relationship data generation means, 1133. . . graph data generation means, 1134. . . fuel consumption indication data generation means, 1135. . . rotation speed indication data generation means, 1136. . . ship speed indication data generation means, 1137. . . load indication data generation means, 1138. . . navigation efficiency indication data generation means.

What is claimed is:

1. A data-processing device comprising:
a processor;
a memory;
a communication interface; and
an input/output interface;
the processor being configured to
acquire reference ship characteristic data that indicates calculated correspondences between states under which one ship is navigated and performances of the one ship when the one ship is navigated under the states, each of the states being specified by a characteristic lattice point, each characteristic lattice point being a combination of a representative value of forward draft, a representative value of the after draft, a representative value of wind direction, a representative value of wind speed, a representative value of wave direction, a representative value of wave height, a representative value of wave period, and a representative value of rotation speed of a propeller that drives the one ship, each of the performances being specified by two or more indicators from among a rotation speed indicator that indicates a level of the rotation speed, a fuel consumption indicator that indicates a fuel consumption which is amount of fuel consumed by the one ship per unit time or per unit navigation distance, a ship speed indicator that indicates a level of navigation speed of the one ship, an engine load indicator that indicates a level of load on a propulsion device of the one ship, and a navigation efficiency indicator that indicates a level of navigation efficiency of the one ship;

acquire actual ship characteristic data that indicates the performances of the one ship when the one ship is navigated under an actual state specified by the actual ship characteristic data;

generate, on a basis of the actual ship characteristic data, graph data that illustrates plural graphs pertaining to plural states pertaining to plural characteristic lattice points, each of the plural graphs representing a relationship between two or more indicators from among the rotation speed indicator, the fuel consumption indicator, the ship speed indicator, the engine load indicator, and the navigation efficiency indicator, when the one ship is navigated under-a corresponding state pertaining to a corresponding characteristic lattice point indicated by the actual ship characteristic data;

output the graph data;

amend the reference ship characteristic data with the actual ship characteristic data by interpolating a characteristic lattice point of the reference ship characteristic data and the actual ship characteristic data; and control a component of operational equipment of the one ship based on the amended reference ship characteristic data.

2. The data-processing device according to claim 1, wherein the processor is further configured to:

acquire the reference ship characteristic data indicates calculated correspondences between the states and the performances, each of the states being specified by a combination of plural parameters pertaining to wind and/or waves and one or more parameters pertaining to draft of the one ship, acquire draft condition data that indicates a condition pertaining to a draft of the one ship, and generate the graph data that illustrates the plural graphs, each of the plural graphs representing the relationship between the two or more indicators when the one ship is navigated under the corresponding state meeting both of the condition indicated by the actual ship characteristic data and the condition indicated by the draft condition data.

3. The data-processing device according to claim 1, wherein the processor is further configured to:

generate the graph data that illustrates the plural graphs which illustrate a range in which the propulsion device is used safely under the corresponding state.

4. The data-processing device according to claim 1, wherein
the processor is further configured to:
acquire rotation speed indication data that indicates a rotation speed indicator that indicates a level of rotation speed of the propeller,
generate indication data that indicates any of the fuel consumption indicator or ship speed indicator corresponding to the rotation speed indicator indicated by the rotation speed indication data on a basis of the ship characteristic data, and
output the indication data or data generated using the indication data.

5. The data-processing device according to claim 4, wherein
the processor is further configured to:
acquire plural items of wind/wave state data each of which indicates a wind and/or waves state within a specific period,
calculate frequency distribution of wind and/or wave state in the specific period using the plural items of the wind/wave state data, and
generate data that indicates frequency distribution of any of the fuel consumption indicator or ship speed indicator on a basis of the frequency distribution of wind and/or wave state.

6. The data-processing device according to claim 1, wherein
the processor is further configured to:
acquire fuel consumption indication data that indicates a fuel consumption indicator that indicates a level of fuel consumption which is the amount of fuel consumed by the one ship per unit time or per unit navigation distance,
generate indication data that indicates any of the rotation speed indicator or ship speed indicator corresponding to the fuel consumption indicator indicated by the fuel consumption indication data on a basis of the ship characteristic data, and
output the indication data or data generated using the indication data.

7. The data-processing device according to claim 6, wherein
the processor is further configured to:
acquire plural items of wind/wave state data each of which indicates a wind and/or waves state within a specific period,
calculate frequency distribution of wind and/or wave state in the specific period using the plural items of the wind/wave state data, and
generate data that indicates frequency distribution of any of the rotation speed indicator or ship speed indicator on a basis of the frequency distribution of wind and/or wave state.

8. The data-processing device according to claim 1, wherein
the processor is further configured to:
acquire ship speed indication data that indicates a ship speed indicator that indicates a level of navigation speed of the one ship,
generate indication data that indicates any of the fuel consumption indicator or rotation speed indicator corresponding to the ship speed indicator indicated by the ship speed indication data on a basis of the ship characteristic data, and
output the indication data or data generated using the indication data.

9. The data-processing device according to claim 8, wherein
the processor is further configured to:
acquire plural items of wind/wave state data each of which indicates a wind and/or waves state within a specific period,
calculate frequency distribution of wind and/or wave state in the specific period using the plural items of the wind/wave state data, and
generate data that indicates frequency distribution of any of the fuel consumption indicator or rotation speed indicator on a basis of the frequency distribution of wind and/or wave state.

10. The data-processing device according to claim 1, wherein
the processor is further configured to:
acquire the reference ship characteristic data that indicates correspondences between states under which the one ship is navigated and referential performances of the one ship when the one ship is navigated under the states,
acquire the actual ship characteristic data that indicates correspondences between states under which the one ship is navigated and actual performances of the one ship when the one ship has previously been navigated under the states, and
generate the ship characteristic data on a basis of the reference ship characteristic data and the actual ship characteristic data.

11. The data-processing device of claim 1, wherein the processor is configured to control an engine of the one ship by an engine control device based on the amended reference ship characteristic data.

12. A non-transitory computer-readable recording medium that continuously records a program, that when executed by a processor, cause the processor to:
acquire reference ship characteristic data that indicates calculated correspondences between states under which one ship is navigated and performances of the one ship when the one ship is navigated under the states, each of the states being specified by a characteristic lattice point, each characteristic lattice point being a combination of a representative value of forward draft, a representative value of the after draft, a representative value of wind direction, a representative value of wind speed, a representative value of wave direction, a representative value of wave height, a representative value of wave period, and a representative value of rotation speed of a propeller that drives the one ship, each of the performances being specified by two or more indicators from among a rotation speed indicator that indicates a level of the rotation speed, a fuel consumption indicator that indicates a fuel consumption which is amount of fuel consumed by the one ship per unit time or per unit navigation distance, a ship speed indicator that indicates a level of navigation speed of the one ship, an engine load indicator that indicates a level of load on a propulsion device of the one ship, and a navigation efficiency indicator that indicates a level of navigation efficiency of the one ship,
acquire actual ship characteristic data that indicates the performances of the one ship when the one ship is navigated under an actual state specified by the actual ship characteristic data;
generate, on a basis of the actual ship characteristic data, graph data that illustrates plural graphs pertaining to plural states pertaining to plural characteristic lattice points, each of the plural graphs representing a relationship between two or more indicators from among the rotation speed indicator, the fuel consumption indicator, the ship speed indicator, the engine load indicator, and the navigation efficiency indicator, when the one ship is navigated under a corresponding state pertaining to a corresponding characteristic lattice point indicated by the actual ship characteristic data, output the graph data, amend the reference ship characteristic data with the actual ship characteristic data by interpolating a characteristic lattice point of the reference ship characteristic data and the actual ship characteristic data, and control a component of operational equipment of the one ship based on the amended reference ship characteristic data.

13. The non-transitory computer-readable recording medium of claim 12, wherein the program causes the computer to control an engine of the one ship by an engine control device based on the amended reference ship characteristic data.

14. A data-processing method comprising:

a step in which a processor acquires reference ship characteristic data that indicates calculated correspondences between states under which one ship is navigated and performances of the one ship when the one ship is navigated under the states, each of the states being specified by a characteristic lattice point, each characteristic lattice point being a combination of a representative value of forward draft, a representative value of the after draft, a representative value of wind direction, a representative value of wind speed, a representative value of wave direction, a representative value of wave height, a representative value of wave period, and a representative value of rotation speed of a propeller that drives the one ship, each of the performances being specified by two or more indicators from among a rotation speed indicator that indicates a level of the rotation speed, a fuel consumption indicator that indicates a fuel consumption which is amount of fuel consumed by the one ship per unit time or per unit navigation distance, a ship speed indicator that indicates a level of navigation speed of the one ship, an engine load indicator that indicates a level of load on a propulsion device of the one ship, and a navigation efficiency indicator that indicates a level of navigation efficiency of the one ship, a step in which the processor acquires actual ship characteristic data that indicates the performances of the one ship when the one ship is navigated under an actual state specified by the actual ship characteristic data, a step in which the processor generates, on a basis of the ship characteristic data, graph data that illustrates plural graphs pertaining to plural states pertaining to wind and/or waves, each of the plural graphs representing a relationship between two or more indicators from among the rotation speed indicator, the fuel consumption indicator, the ship speed indicator, the engine load indicator, and the navigation efficiency indicator, when the one ship is navigated under a corresponding state pertaining to a corresponding characteristic lattice point indicated by the actual ship characteristic data, a step in which the processor outputs the graph data, a step in which the processor amends the reference ship characteristic data with the actual ship characteristic data by interpolating a characteristic lattice point of the reference ship characteristic data and the actual ship characteristic data, and a step in which the processor controls a component of operational equipment of the one ship based on the amended reference ship characteristic data.

15. The method of claim 14, further comprising a step in which the processor controls an engine of the one ship by an engine control device based on the amended reference ship characteristic data.

* * * * *